(12) United States Patent
Kim

(10) Patent No.: US 6,930,852 B2
(45) Date of Patent: Aug. 16, 2005

(54) METHOD OF AND APPARATUS FOR PREVENTING GENERATING OF OFF-TRACKING IN HARD DISC DRIVE

(75) Inventor: Jae-hyeong Kim, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 240 days.

(21) Appl. No.: 10/435,467

(22) Filed: May 12, 2003

(65) Prior Publication Data

US 2003/0210490 A1 Nov. 13, 2003

(30) Foreign Application Priority Data

May 11, 2002 (KR) ........................................ 2002-26031

(51) Int. Cl.[7] .............................................. G11B 5/596
(52) U.S. Cl. ..................................... 360/77.08; 360/75
(58) Field of Search .............................. 360/77.08, 75, 360/57, 25, 48, 31

(56) References Cited

U.S. PATENT DOCUMENTS

| | | | | |
|---|---|---|---|---|
| 4,513,333 A | * | 4/1985 | Young et al. | ............ 360/77.02 |
| 4,771,346 A | * | 9/1988 | Shoji et al. | .................... 360/15 |
| 5,381,281 A | | 1/1995 | Shrinkle et al. | |
| 5,946,157 A | * | 8/1999 | Codilian et al. | .............. 360/75 |
| 5,995,305 A | | 11/1999 | McNeil et al. | |
| 6,023,389 A | * | 2/2000 | Cunningham | ................. 360/75 |
| 6,043,951 A | | 3/2000 | Lee | |
| 6,313,964 B1 | | 11/2001 | Lamberts et al. | |
| 6,519,107 B1 | * | 2/2003 | Ehrlich et al. | ................. 360/75 |

OTHER PUBLICATIONS

Notice to Submit Response (from Korean Patent Office), dated Mar. 4, 2004.

* cited by examiner

Primary Examiner—David Hudspeth
Assistant Examiner—K. Wong
(74) Attorney, Agent, or Firm—Staas & Halsey LLP (57) ABSTRACT

A method and apparatus for preventing off tracking from occurring in a hard disc drive that has at least one track formed using servo signals. The method includes preventing off tracking from occurring when a hard disc drive drives a hard disc having at least one track formed by servo sectors on which servo signals are recorded, checking whether the width of the track is uneven using burst regions A, B, C, and D, the burst regions A through D being included on each servo signal, and preventing the occurrence of off tracking when the width of the track is not even. Accordingly, it is possible to prevent a potential occurrence of off tracking due to a track of an uneven width, thereby guaranteeing the reliability of a hard disc. Also, a track of uneven width with other tracks in the hard disc can be changed into a track of even width, thereby increasing the processing yield during manufacturing of the hard disc.

28 Claims, 9 Drawing Sheets

METHOD OF AND APPARATUS FOR PREVENTING GENERATING OF OFF-TRACKING IN HARD DISC DRIVE

CROSS-REFERENCE TO RELATED APPLICATIONS

This application claims the priority of Korean Patent Application No. 2002-26031, filed May 11, 2002 in the Korean Intellectual Property Office, which is incorporated herein in its entirety by reference.

BACKGROUND OF THE INVENTION

1. Field of the Invention

The present invention relates to a hard disc, and more particularly, to a method of and an apparatus for preventing off tracking from occurring when a hard disc drive operates.

2. Description of the Related Art

An increase in a recording density of a hard disc requires a precise positioning of a servo writer that writes a servo signal on the hard disc.

In general, a track is formed by servo signals that are written on the hard disc by the servo writer. To form tracks of even widths on the hard disc, the servo writer must precisely write the servo signals on the hard disc. That is, the servo writer is required to move along the track accurately without swaying during writing the servo signals on the hard disc. If the servo signals are not precisely written on the hard disc, i.e., the servo writer is shaken during writing of the servo signals, it is disadvantageous that the tracks of different widths are obtained from the hard disc. When the widths of the tracks are not uniform, a position of data to be accessed by a head (not shown) of a hard disc drive may be changed when the head writes or reads data on or from the track. For instance, when the head is positioned on an $n+1^{th}$ track, the data will be certainly recorded on an $n-1^{th}$ track if the width of each track is even. However, if the head is positioned at the $n+1^{th}$ track, and the width of nth track is narrower than those of other tracks, the data may be recorded in a border region between the $n-1^{th}$ track and $n-2^{th}$ track. Further, if the head is positioned at the $n+1^{th}$ track, and the width of $n^{th}$ track is wider than those of other tracks, the data may be recorded in another border region between the $n^{th}$ track and $n-1^{th}$ track. Accordingly, the tracks of uneven widths may result in occurrence of off tracking that causes the data to be recorded in the border region between the tracks.

SUMMARY OF THE INVENTION

The present invention provides a method of preventing occurrence of off tracking due to unevenness of tracks widths formed on a hard disc.

The present invention also provides an apparatus for preventing occurrence of off tracking, the apparatus performing such a method.

Additional aspects and advantages of the invention will be set forth in part in the description which follows and, in part, will be obvious from the description, or may be learned by practice of the invention.

According to an aspect of the present invention, a method of preventing off tracking from occurring when a hard disc drive drives a hard disc having at least one track formed by servo sectors on which servo signals are recorded, includes checking whether a width of the at least one track is uneven using burst regions A, B, C, and D, which are included on each servo signal, and preventing occurrence of the off tracking when the width of the at least one track is not even.

According to another aspect of the present invention, an apparatus for preventing off tracking from occurring when a hard disc drive drives a hard disc having at least one track formed of servo sectors on which servo signals are recorded, includes a width checking (measuring) unit checking whether a width of the at least one track is even using burst regions A, B, C, and D written on each servo sector and outputting a checking result, and a controller controlling a width checking (measuring) unit and preventing occurrence of the off tracking in response to the checking result.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described in order to explain the present invention by referring to the figures. This invention may, however, be embodied in many different forms and should not be construed as being limited to the embodiments set forth herein; rather, these embodiments are provided so that this disclosure will be thorough and complete, and will fully convey the concept of the invention to those skilled in the art. The same reference numerals in different drawings represent the same element.

Hereinafter, a method of preventing off tracking from occurring in a hard disc drive according to an embodiment of the present invention, will be described with reference to accompanying drawings.

Figure 1:
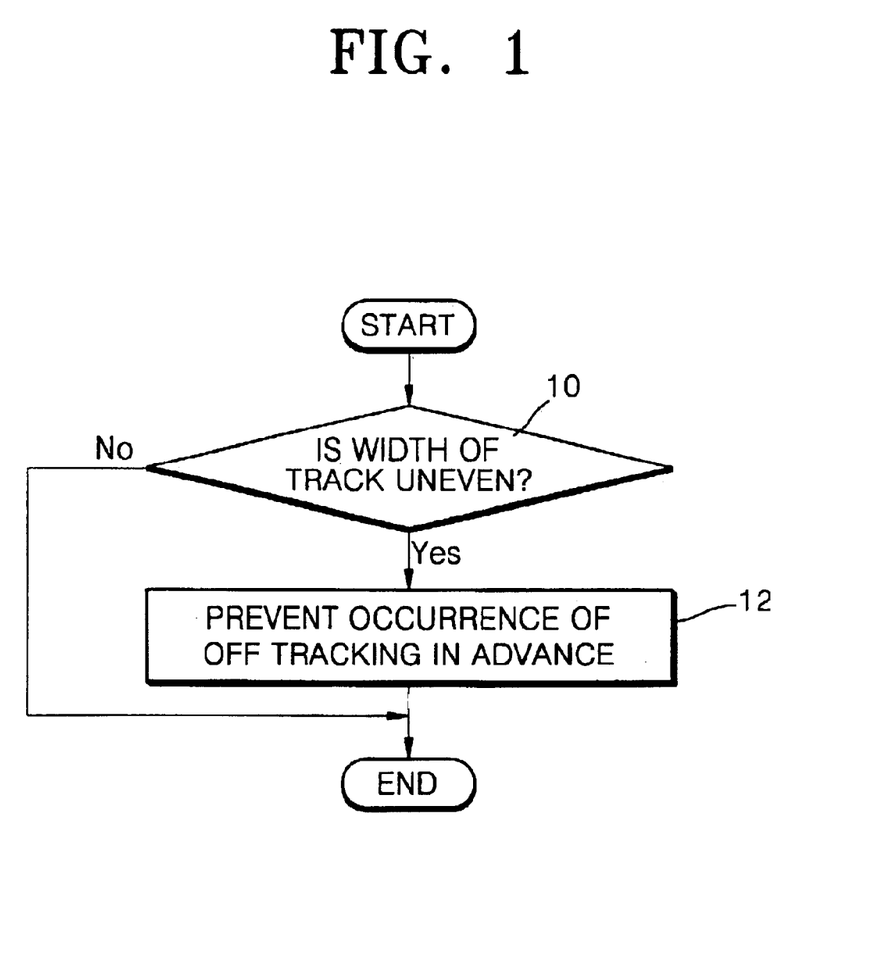
FIG. 1 is a flowchart illustrating a method of preventing off tracking from occurring in a hard disc drive according to an embodiment of the present invention.

FIG. 1 is a flowchart illustrating the method of preventing the off tracking from occurring when the hard disc drive operates. The method of FIG. 1 includes operations 10 and 12 of preventing occurrence of the off tracking by checking if widths of tracks are even.

More specifically, in operation 10 of the method of FIG. 1, whether the widths of the tracks are even is first checked using burst regions A, B, C, and D which are included in each servo sector.

Figure 2:
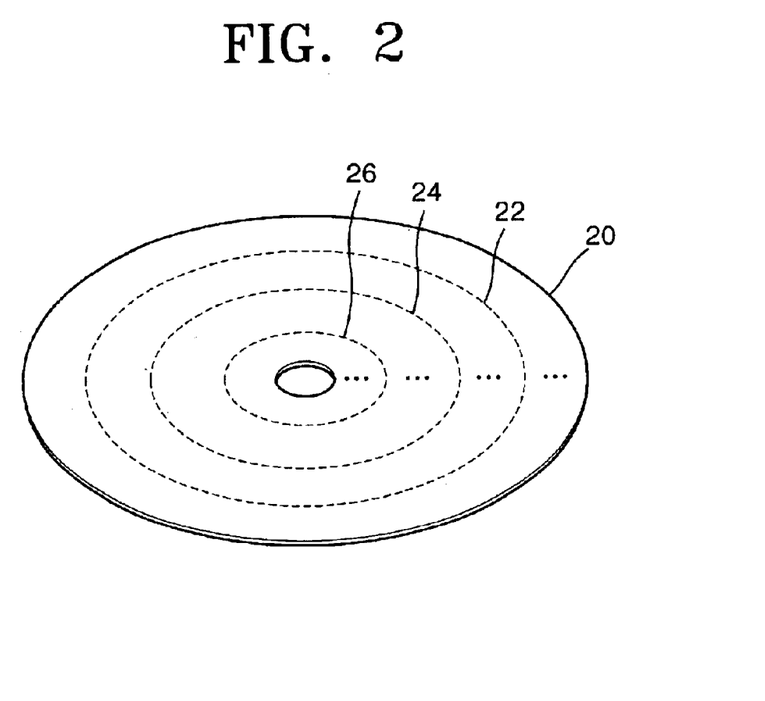
FIG. 2 is an exterior view of a hard disc used in the method shown in FIG. 1.
Figure 3:
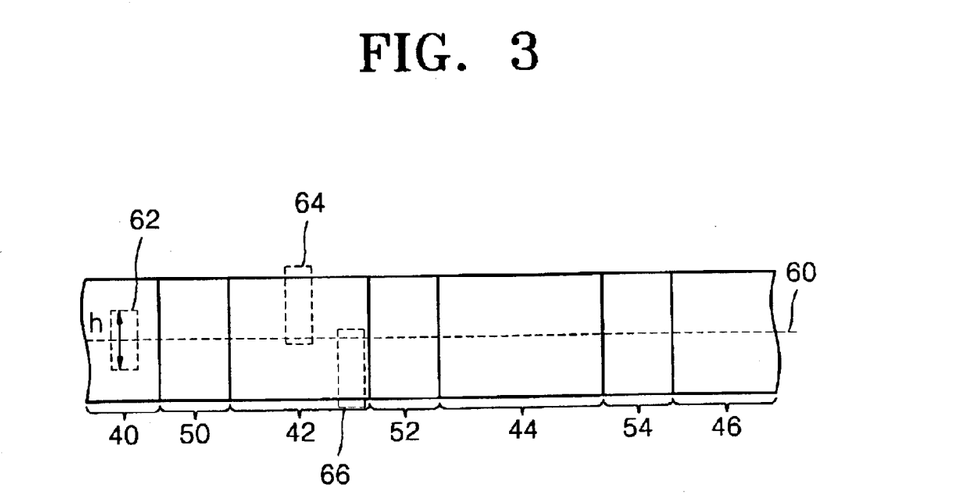
FIG. 3 is a diagram illustrating a format of each track of the hard disc of FIG. 2.

FIG. 2 is an exterior view of a hard disc 20 that includes a plurality of tracks . . . , 22, . . . , 24, . . . , and 26. FIG. 3 is a partial diagram illustrating a format of each track of the hard disc 20 of FIG. 2, each track including data sectors . . . , 40, 42, 44, 46, . . . , and servo sectors . . . , 50, 52, 54, . . . .

In general, a servo writer writes a plurality of servo signals on the servo sectors . . . , 50, 52, 54, . . . of each track formed on the hard disc 20 of FIG. 2. The writing of the servo signals on the servo sectors . . . , 50 52, 54, . . . results in formation of ring-shaped tracks as shown in FIG. 2. Each of the servo sectors . . . , 50, 52, 54, . . . includes the burst regions A, B, C, and D in which track numbers are stored. Also, the hard disc drive searches for a central line 60 of the track using at least one of the burst regions A, B, C, and D recorded on each servo sector . . . , 50, 52, 54, or . . . , and then moves a head (not shown) along the central line 60 of the track . . . , 22, . . . , 24, . . . , or 26.

Figure 4:
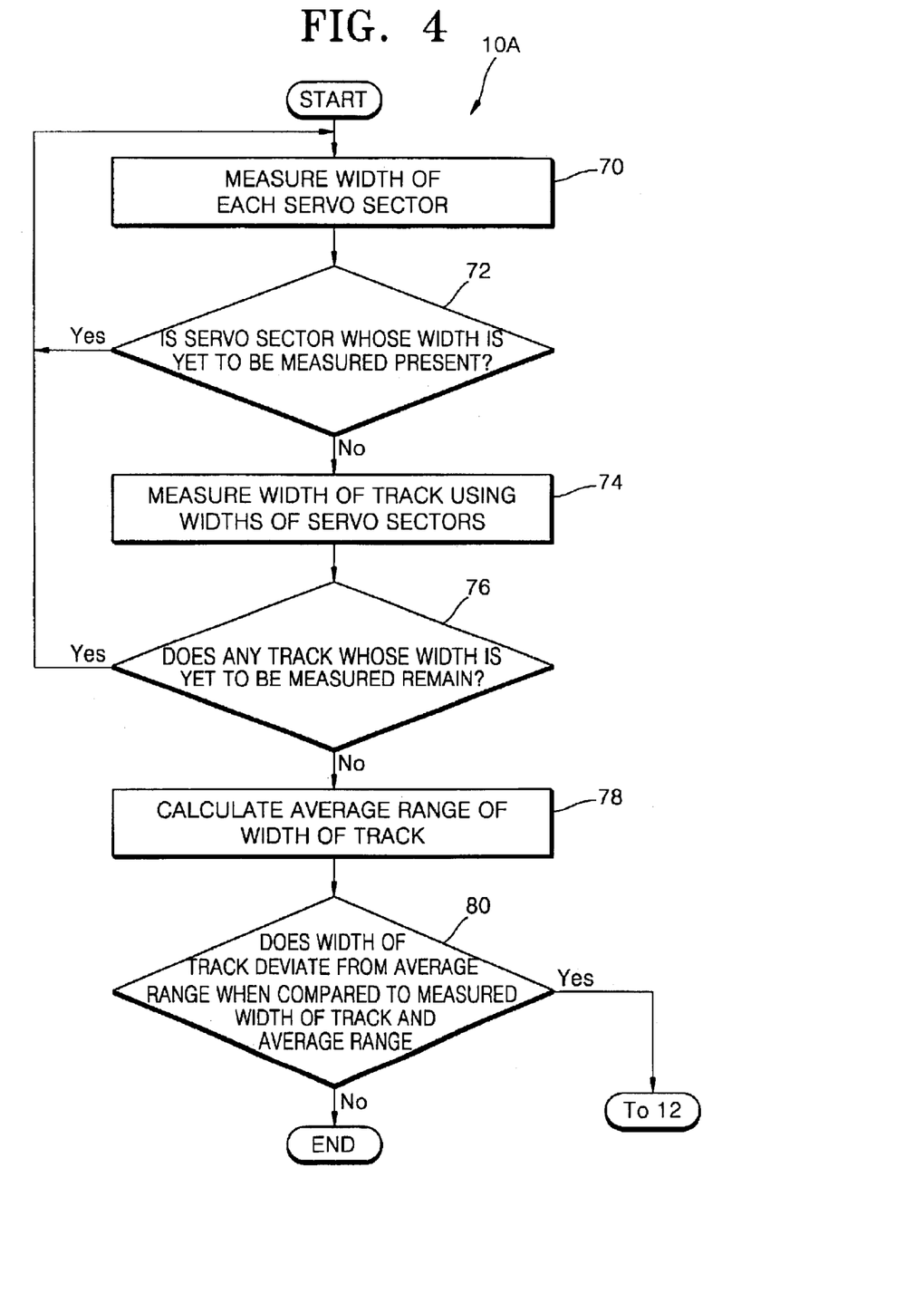
FIG. 4 is a detailed flowchart illustrating operation 10 of the method shown in FIG. 1.

The operation 10 of FIG. 1 will now be described. FIG. 4 is a detailed flowchart 10A of the operation 10 of FIG. 1. The detailed flowchart 10A includes operations 70 through 78 of calculating an average range of the widths of the tracks and operation 80 of comparing the average range with the width of each track.

To perform operation 10 included in the method of preventing the occurrence of the off tracking, a head 62 (64 or 66), which is shown in FIG. 3, of the hard disc drive is moved by a first certain distance from the central line 60 in a first direction in which the track number of the tracks is increased as indicated by a moving head 64 of FIG. 3, is then moved by a second certain distance from the central line 60 in a second direction in which the track number of the tracks is reduced as indicated by another moving head 66 of FIG. 3, and the width of each servo sector is measured using the burst regions A, B, C, and D that are read by the moving head, in operation 70. The narrower the width of the head, the more closely the first or second certain distance approximates a quarter of the width of the track. For instance, the first or second certain distance from the central line 60 may correspond to the quarter of the width of a track. The head 62 of the hard disc drive reads the tracks in an ascending order, i.e., from a first track having a smallest track number to a second track having a largest track number.

Figure 5:
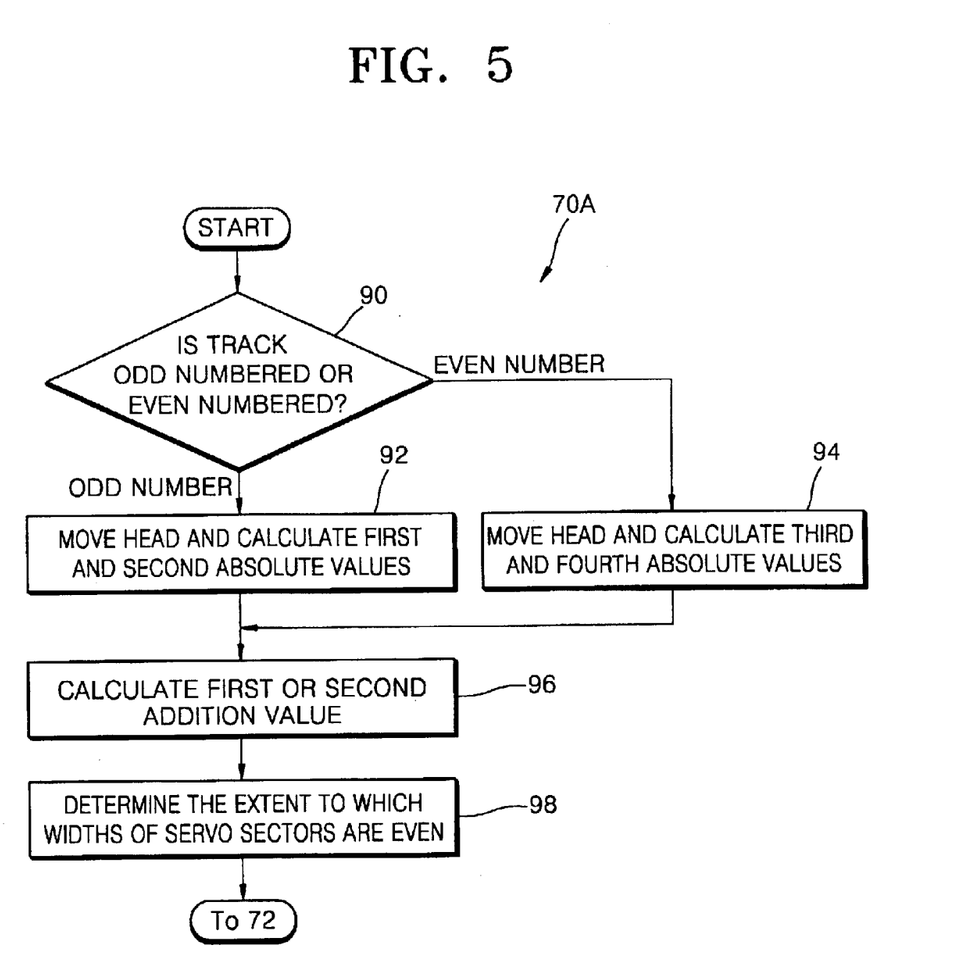
FIG. 5 is a detailed flowchart illustrating operation 70 of the method shown in FIG. 4.

FIG. 5 is a detailed flowchart 70A of the operation 70 of FIG. 4. The detailed flowchart 70A of the operation 70 includes operations 90 through 94 of calculating first through fourth absolute values by moving the head 62, and operations 96 and 98 of calculating first and second addition values and checking whether the widths of the servo sectors . . . , 50, 52, 54, . . . are even.

Figure 6:
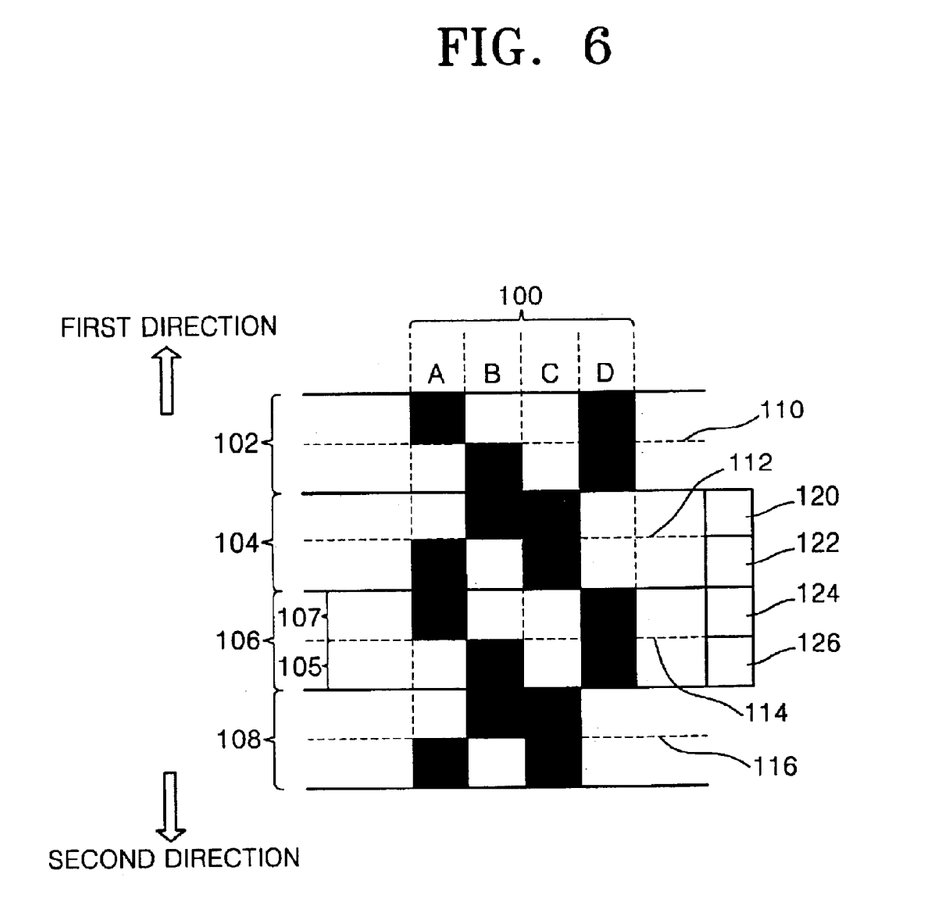
FIG. 6 is a diagram illustrating examples of servo sectors having burst regions A through D in a plurality of tracks of the hard disc shown in FIG. 2.

FIG. 6 is a diagram illustrating examples of servo sectors 100 having the burst regions A through D in the tracks. Referring to FIG. 6, shade (dark or black) portions denote regions where signals exist, and non-shade (non-dark or non-black) portions denote regions where the signals do not exist.

Referring to FIG. 6, to perform operation 70 of FIG. 4, whether a track is an even numbered track 102 or 106, or an odd numbered track 104 or 108, is checked in operation 90. In operation 92, if it is determined in operation 90 that the track is the odd numbered track 104 or 108, the head of the hard disc drive is moved in the first direction by a first certain distance to a first location 120 from a central line 112 or 116 of the track 104 or 108, and a first absolute value T1 is obtained by subtracting the burst region D from the burst region B, which are read by the moving head 64 of FIG. 3, using the following Equation 1. That is, if the track shown in FIG. 3 is the odd numbered track, the head 62, which has a width h and is positioned at the central line 60 of the track, is moved to the first certain distance in the first direction, and the burst regions B and D are read by the moving head 64.

Equation 1 is as follows:

$$T1=|B-D| \quad (1)$$

where B and D denote shade portions of the burst regions B and D shown in FIG. 6.

Also, in operation 92, the head 62 of the hard disc drive is moved in the second direction by a second distance to a second location 122 from the central line 112 or 116 of the odd-numbered track 104 or 108, and a second absolute value T2 is calculated by subtracting the burst region D from the burst region A, which are read by the moving head 66 of FIG. 3, using the following Equation 2. That is, when the track of FIG. 3 is the odd numbered track, the head 62, which is positioned at the central line 60 of the track, is moved to the second certain distance in the second direction, and the burst regions A and D are read by a moving head 66.

$$T2=|A-D| \quad (2)$$

where A denotes a shade portion of the burst region A shown in FIG. 6.

However, when the track is the even numbered track 102 or 106, the head 62 is moved in the first direction by the first certain distance to a third location 124 from a central line 110 or 114 of the track 102 or 106, and a third absolute value T3 is calculated by subtracting the burst region C from the burst region A that are read by the moving head 64, using the following Equation 3, in operation 94. That is, when the track of FIG. 3 is the even-numbered track 102 or 106, the head 62, which is positioned at the central line 60 of the track, is moved in the first direction by the first certain distance, and the burst regions A and C are read by the moved head 64.

$$T3=|A-C| \quad (3)$$

where C denotes a shade portion of the burst region C of FIG. 6.

Also, in operation 94, the head 62 is moved in the second direction 126 by the second certain distance to a fourth location 126 from the central line 110 or 114 of the even numbered track 102 or 106, and a fourth absolute value T4 is calculated by subtracting the burst region C from the burst region B that are read by the moving head 66, using the following Equation 4. That is, when the track of FIG. 3 is the even numbered track, the head 62, which is positioned at the central line 60 of the track, is moved in the second direction by the second certain distance, and the burst regions B and C are read by the moving head 66.

$$T4=|B-C| \quad (4)$$

In operation 96, the first and second absolute values T1 and T2 are added to calculate a first addition value after operation 92, or the third and fourth absolute values T3 and T4 are added to calculate a second addition value after operation 94. After operation 96, an extent to which the widths of the servo sectors are even is determined using the first or second addition value in operation 98, and then operation 72 is performed.

Figure 7:
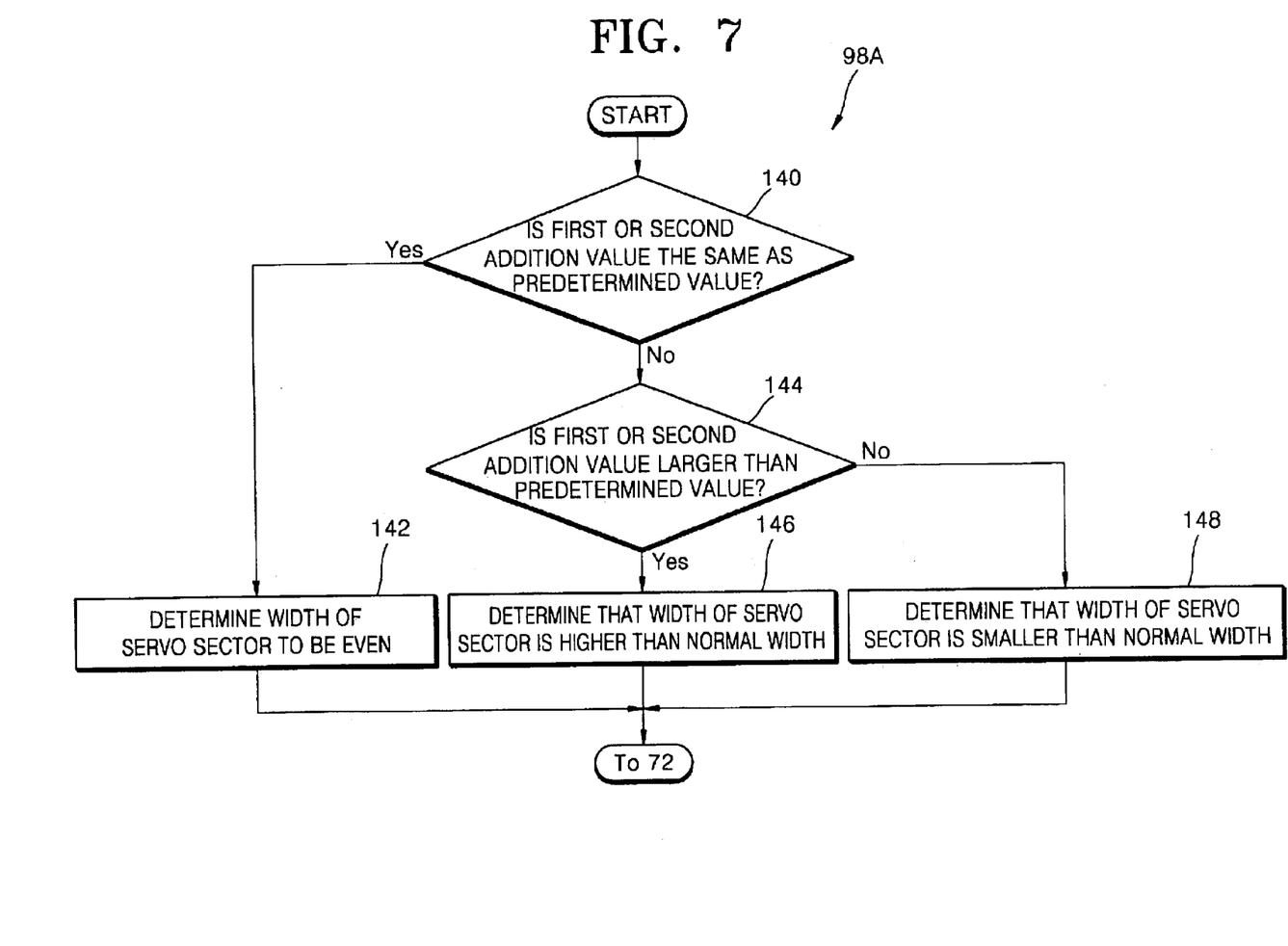
FIG. 7 is a detailed flowchart illustrating operation 98 of FIG. 5.

FIG. 7 is a detailed flowchart 98A of the operation 98 of FIG. 5 according to the present invention. The detailed flowchart 98A includes operations 140 through 148 of comparing the first or second addition value with a predetermined value to generate a comparison result, and determining whether the widths of the servo sectors are even based on the comparison result.

Referring to FIG. 7, in order to perform operation 98 of FIG. 5, whether the first or second addition value is the same as a predetermined value is checked in operation 140. If it is determined in operation 140 that the first or second addition value is the same as the predetermined value, the widths of the servo sectors are regarded as being even in operation 142, and operation 72 is performed.

However, if the first or second addition value is not the same as the predetermined value, whether the first or second addition value is larger than the predetermined value is checked in operation 144. If the first or second addition value is larger than the predetermined valued, the widths of the servo sectors are regarded as a larger width than a normal width in operation 146, and operation 72 is performed. However, if the first or second addition value is smaller than the predetermined value, the widths of the servo sectors are regarded as a smaller width than the normal width in operation 148, and operation 72 is performed.

Figure 8:
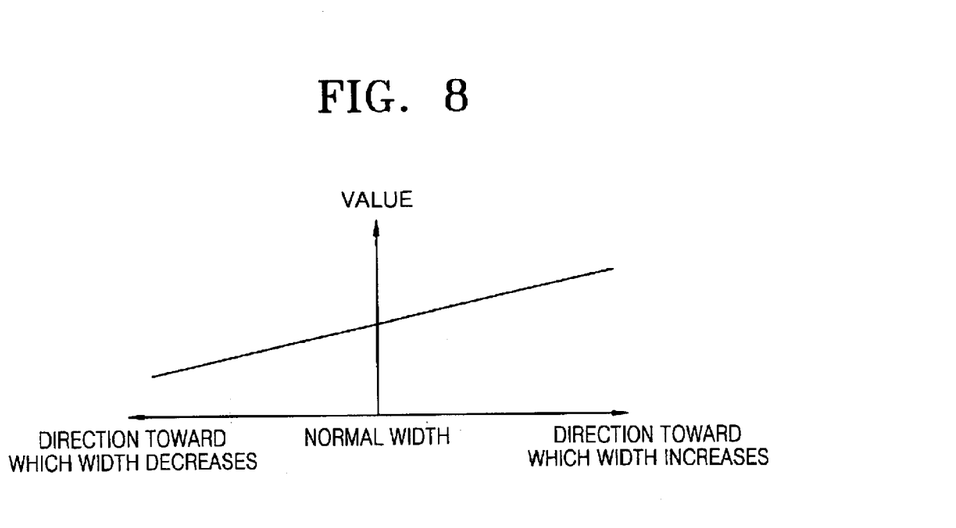
FIG. 8 is a graph illustrating variations in first through fourth absolute values, and a first or second addition value according to a change in widths of the servo sectors shown in FIG. 6.

FIG. 8 is a graph illustrating variations in the first, second, third or fourth absolute value, and the first or second addition value according to a change in the width of a servo sector. Referring to FIG. 8, an x-axis indicates a variation in the width of the servo sector 100, and a y-axis indicates a variation in the first, second, third or fourth absolute value T1, T2, T3 or T4, or the first or second addition value.

As shown in FIG. 8, the more the width of the servo sector increases compared with the normal width, the larger the first, second, third, or fourth absolute value T1, T2, T3, or T4 is. The more the width of the servo sector decreased compared with the normal width, the smaller the first, second, third, or fourth absolute value T1, T2, T3, or T4 is. Similarly, as shown in FIG. 8, the more the width of the servo sector 100 increases compared with the normal width, the larger the first or second addition value is, and the reverse is also true.

For instance, if the width of the even numbered track 106 of FIG. 6 is even to the widths of the other tracks, the fourth absolute value T4, which is obtained by subtracting the shade portion of the burst region C from the shade portion of the burst region B, is reduced as shown in FIG. 8, when a lower half width 105 of the track 106 with regard to the central line 114 decreases. That is, when the width 105 decreases, the width of the shade portion of the burst region B in the lower half width 105 of the track 106 also decreases but the width of the shade portion of the burst region C is maintained. A reduction in the fourth absolute value T4 makes the second addition value be smaller than the predetermined value. In this case, the width of the servo sector 100 is determined as being decreased.

However, if an upper half width 107 of the track 106 of FIG. 6 with regard to the central line 114 increases, the third absolute value T3, which is obtained by subtracting the dark (shade) portion of the burst region C from the dark (shade) portion A of the burst region A, increases as shown in FIG. 8. That is, when the width 107 increases, the width of the dark portion of the burst A of the upper half width 107 of the track 106 also increases, but the width of the shade portion C is maintained. An increment in the third absolute value T3 makes the second addition value be larger than the predetermined value. In this case, the width of the servo sector 100 is determined to have increased.

Meanwhile, after operation 70, it is checked if the track includes a servo sector whose width is not measured, in operation 72. If a track has N servo sectors whose widths are to be measured, it is checked whether all of the widths of the N servo sectors are measured.

If it is determined in operation 72 that there are servo sectors whose widths are not measured, operation 70 is performed. Here, in operation 70, the widths of servo sectors whose widths are not measured are measured. However, if it is determined in operation 72 that there is no servo sector whose widths are not measured, a width of a track made of servo sectors is measured using the widths of the servo sectors 100, which are measured in operation 70, in operation 74.

After operation 74, it is checked whether measurement of all of the widths of the tracks formed on the hard disc 20 is complete, in operation 76. If there are remaining tracks whose widths are yet to be measured, the method returns to operation 70 to perform operations 70 through 74 on the remaining tracks. However, when there is no track whose width is to be measured, an average range of the widths of the tracks is calculated using the widths of the tracks, which are measured in operation 74, in operation 78. The average range is determined using an average value of the measured widths of the tracks in consideration of a predetermined error.

After operation 78, whether the width of each track falls within the average range is checked in operation 80. If the widths of all of the tracks fall within the average range, the widths of these tracks are regarded as being even. Therefore, the method of preventing the off tracking from occurring in the hard disc drive illustrated in FIG. 1 or 4 is terminated.

However, if the width of the track does not fall within the average range, i.e., if there is a track of an uneven width, this track may cause the off tracking occurring in the hard disc drive. Therefore, actions of preventing the occurrence of the off tracking in advance are taken in the track in operation 12 illustrated in FIG. 1.

Hereinafter, the operation 12 of FIG. 1 according to the present invention will be described with reference to the accompanying drawings.

Figure 9:
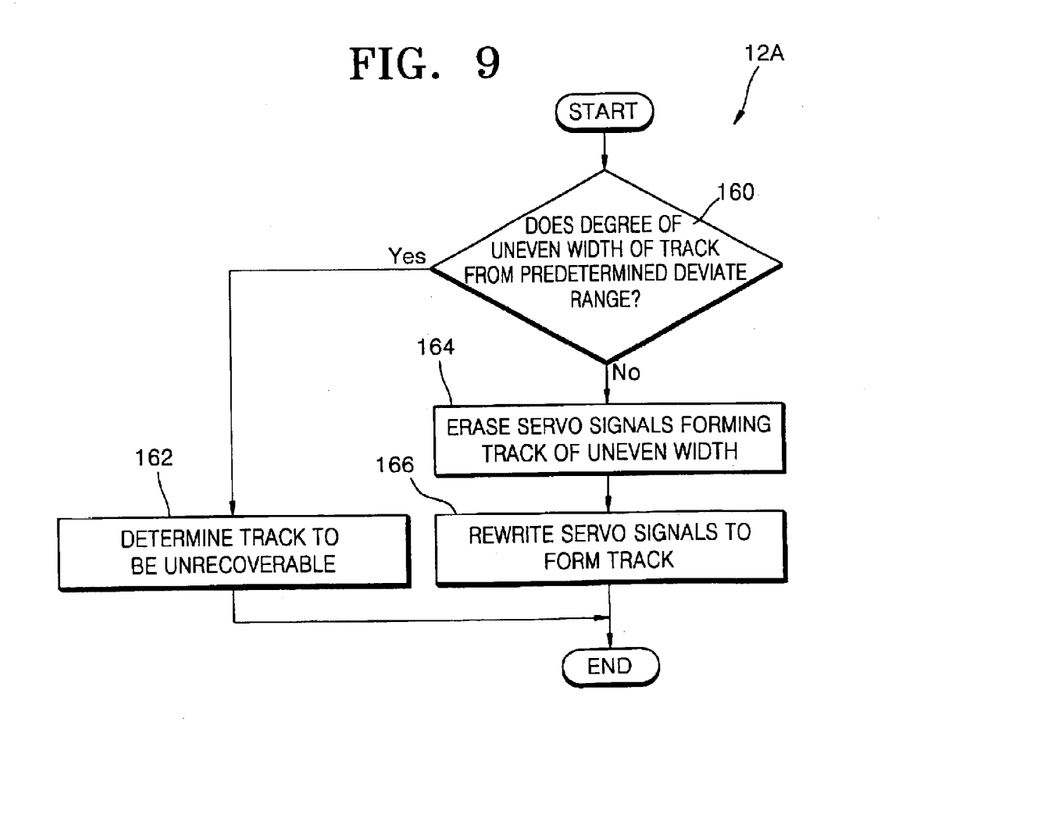
FIG. 9 is another detailed flowchart illustrating operation 12 of the method shown in FIG. 1.

FIG. 9 is another detailed flowchart 12A of the operation 12 of FIG. 1. The detailed flowchart 12A includes operations 160 through 166 of recovering the tracks of uneven widths in consideration of degrees of the uneven widths. According to the detailed flowchart 12A of the present invention, when the widths of the tracks are uneven, whether a degree of the uneven width of the track falls within a predetermined range is checked in operation 160. If the uneven degree does not fall within the predetermined range, it is determined that the uneven width of the track cannot be recovered in operation 162. However, if the uneven degree falls within the predetermined range, the servo signals, which form the track of the uneven width, are erased in operation 164. After operation 164, the track formed by the erased servo signals is again formed on the hard disc in operation 166.

According to the another detailed flowchart 12A of operation 12, operations 160 and 162 may not be included in detailed flowchart 12A of FIG. 9. More specifically, when it is determined in operation 10 of FIG. 1 that the hard disc has the track of the uneven width, the servo signals, which form the track of the uneven width, are erased in operation 164. After operation 164, the servo signals are again written on the hard disc so as to form a new track having an even width on the track erased when erasing the servo signals, in operation 166.

The another detailed flowchart 12A of the operation 12 according to the present invention may further include, after operation 162, operations (not shown) of checking if a total number of unrecoverable tracks of the hard disc 20 is more than another predetermined value, and determining the hard disc 20 having the unrecoverable tracks the number of which is more than the another predetermined value, as an inferior one when the number of the unrecoverable tracks is more than the another predetermined value.

The aforementioned method of preventing the off tracking from occurring in the hard disc drive according to the present invention may be performed during testing of the hard disc 20 having the tracks formed by the servo signals. In this case, the hard disc 20 having the tracks in which the number of the uneven widths is more than the another predetermined value, is regarded as the inferior one in operation 162, thereby preventing the occurrence of the off tracking due to the tracks of the uneven widths.

Hereinafter, a structure and operations of an apparatus for preventing the off tracking from occurring in the hard disc drive, that performs the aforementioned method of preventing the off tracking, will be described with reference to the accompanying drawings.

Figure 10:
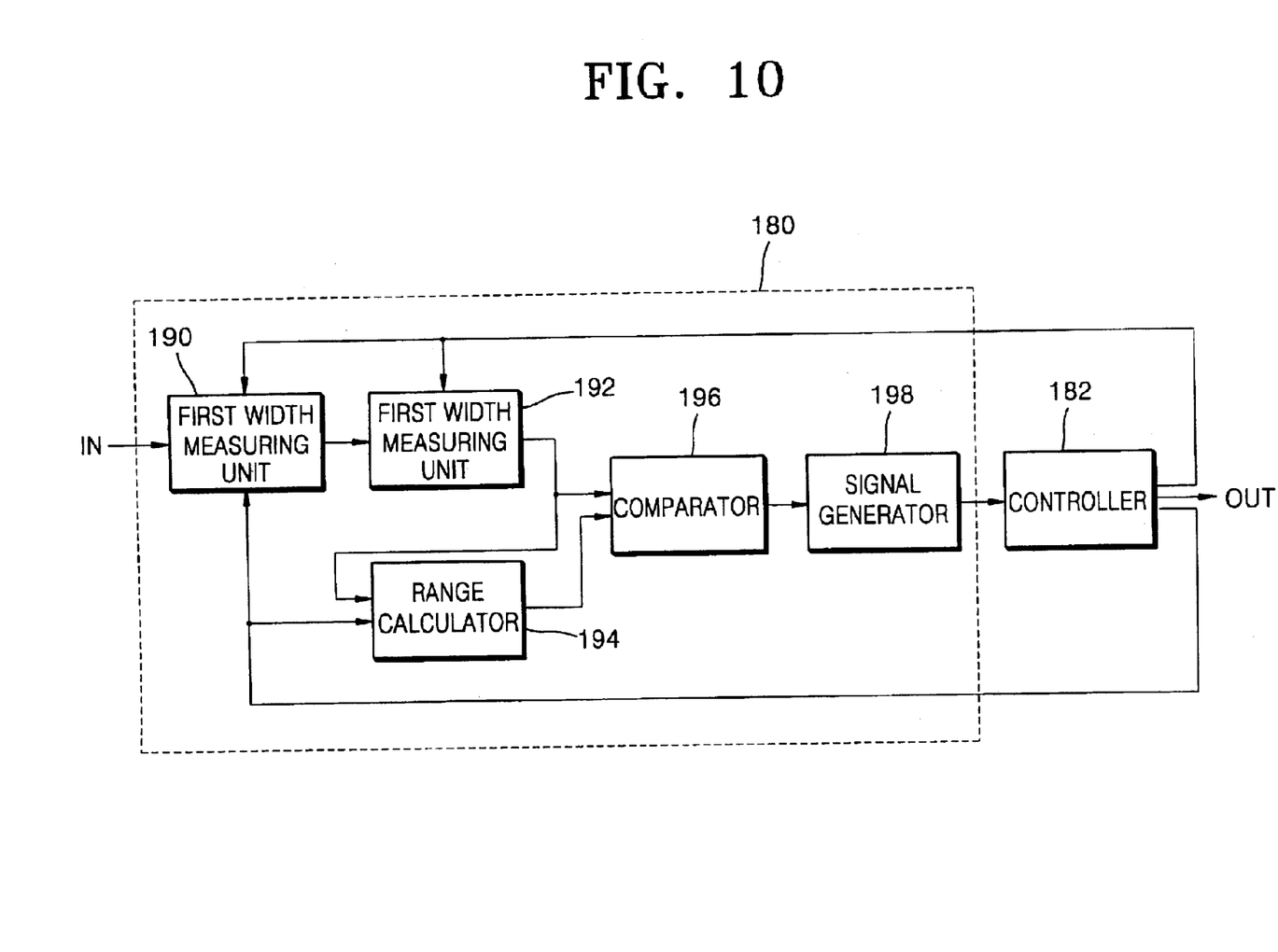
FIG. 10 is a block diagram of an apparatus preventing the off tracking from occurring in the hard disc drive by performing the method shown in FIG. 1.

FIG. 10 is a block diagram of the apparatus for preventing the off tracking from occurring in the hard disc drive by performing the method of preventing the off tracking from occurring when the hard disc drive operates. The apparatus of FIG. 10 includes a width checking unit 180 and a controller 182.

In order to perform operation 10 of FIG. 1 under a control of the controller 182, the width checking unit 180 of FIG. 10 checks whether the widths of the tracks of the hard disc 20 are even, using the burst regions A, B, C, and D, which are input from the head 62 of the hard disc drive via an input terminal IN, and outputs a checking result to the controller 182.

Next, to perform operation 12 of FIG. 1, the controller 182 predicts the occurrence of the off tracking in response to the checking result input from the width checking unit 180 and takes actions of preventing the occurrence of the off tracking in advance. In detail, the controller 182 outputs, in response to the checking result, a first control signal and a second control signal to a servo writer (not shown) via an output terminal OUT. Then, to perform operation 164, the servo writer erases the servo signals, which form the track of the uneven width, in response to the first control signal input from the controller 182. To perform operation 166, the servo writer writes the servo signals on the hard disc 20 to again form a new track of the erased track in response to the second control signal input from the controller 182.

To perform operations of the detailed flowchart 10A of FIG. 4, the width checking unit 180 includes first and second width measuring units 190 and 192, a range calculator 194, a comparator 196, and a signal generator 198.

To perform operation 70, the first width measuring unit 190 of FIG. 10 determines the extent to which the widths of the servo sectors are even in response to a third control signal input from the controller 182, using the burst regions A through D which are read by the head 62 of the hard disc drive and input from the input terminal IN. Next, to perform operation 72, the controller 182 checks if the track has the servo sector 100 whose width is yet to be measured, generates the third control signal based on the checking result, and outputs the generated third control signal to the first and second width measuring units 190 and 192. If the third control signal, which indicates there is another servo sector whose width is yet to be measured, is input from the controller 182 to the first width measuring unit 190, the first width measuring unit 190 may receive the burst regions A through D existing in the servo sector 100 to be measured via the input terminal IN.

In order to perform operation 74, the second width measuring unit 192 measures the width of the track, which includes the servo sectors 100, using the widths of the servo sectors 100 input from the first width measuring unit 190, in response to the third control signal input from the controller 182. For this end, the first width measuring unit 190 may measure the widths of the servo sectors 100 and store the measuring result. In other words, when the second width measuring unit 192 perceives through the third control signal input from the controller 182 that there is no servo sector whose width is to be measured, the second width measuring unit 192 measures the width of the track.

To perform operation 76, the controller 182 checks whether measurement of all of the widths of the tracks written on the hard disc 20 is complete, generates a fourth control signal based on the checking result, and outputs the fourth control signal to the first width measuring unit 190 and the range calculator 194, respectively. When the first width measuring unit 190 perceives through the fourth control signal input from the controller 182 that there is a track whose width is yet to be measured, the first width measuring unit 190 performs operation 70 on the track to be measured.

To perform operation 78, the range calculator 194 calculates the average range of the widths of the tracks using the widths of the tracks input from the second width measuring unit 192 in response to the fourth control signal input from the controller 182, and outputs the calculated average range to the comparator 196. For this, the second width measuring unit 192 may measure the widths of the tracks of the hard disc 20 and store the measuring result. In other words, when the range calculator 194 perceives through the fourth control signal that there is no track whose width is yet to be measured, the range calculator 194 calculates the average range of the widths of the tracks.

To perform operation 80, the comparator 196 compares the width of each track input from the second width measuring unit 192 with the average range input from the range calculator 194, and outputs a comparison result to the signal generator 198. In response to the comparison result input from the comparator 196, the signal generator 198 generates an information signal indicating whether the widths of the tracks are even and outputs the information signal as the checking result to the controller 182. More specifically, when it is recognized from the comparison result input from the comparator 196 that the widths of the tracks do not fall within the average range, the signal generator 198 outputs the information signal indicating that the widths of the tracks do not fall within the average range, to the controller 182. However, when it is recognized from the comparison result input from the comparator 196 that the widths of the tracks fall within the average range, the signal generator 198 outputs the information signal indicating that the widths of the tracks fall within the average range, to the controller 182. Accordingly, the controller 182 can check whether the widths of the tracks fall within the average range, based on the information signal.

Figure 11A:
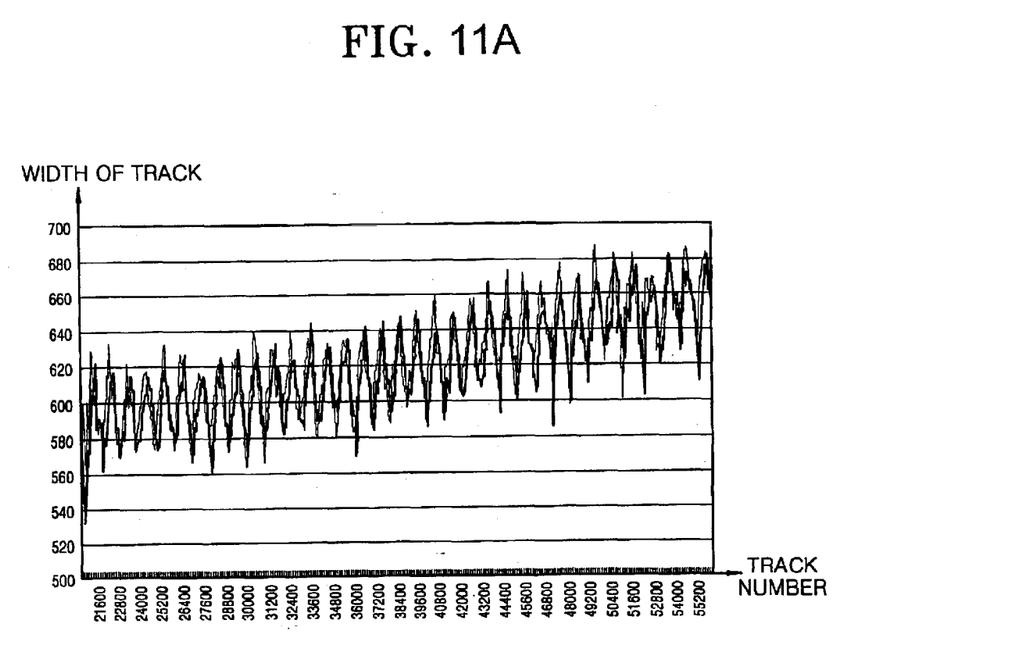
FIGS. 11A and 11B are graphs illustrating the off tracking occurring in the hard disc drive.
Figure 11B:
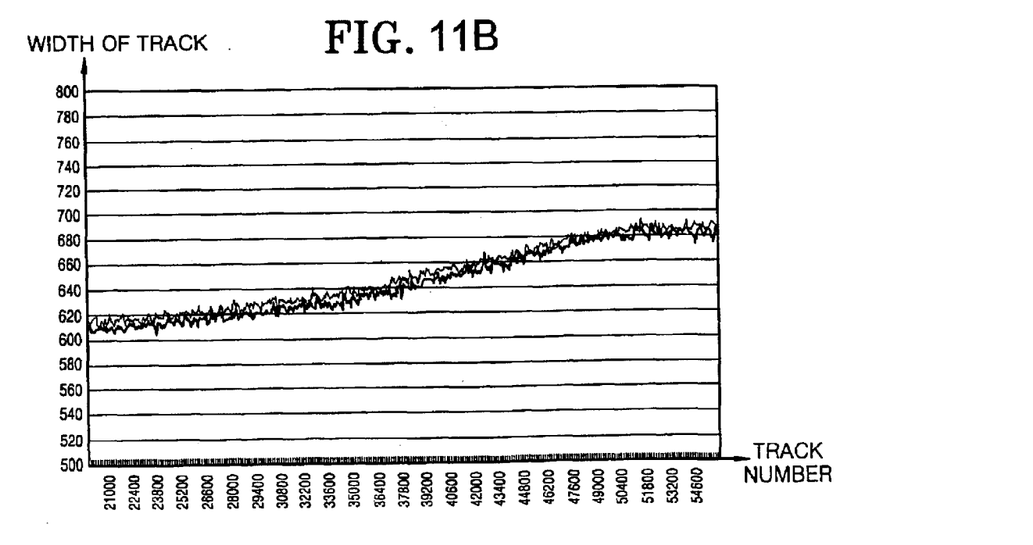

FIGS. 11A and 11B are graphs illustrating the off tracking occurring when the hard disc drive operates. Referring to FIGS. 11A and 11B, each X-axis indicates a track number of the tracks, and each Y-axis indicates the width of the tracks.

If the widths of the tracks . . . , 22, . . . , 24, . . . , 26, . . . formed on the hard disc 20 are measured according to the track number, the off tracking generally occurs at several tracks as shown in FIG. 11A. In the graph of FIG. 11A, a bold line denotes an upper half width of a track, i.e., the upper half width 107 of the track 106 shown in FIG. 6, and the other line denotes a lower half width of the track, i.e., the lower half width 105 of the track 106 shown in FIG. 6. However, it is possible to considerably reduce the occurrence of the off tracking as shown in FIG. 11(*b*) by erasing the servo signals for the track having the uneven width using the method and the apparatus of the present invention for preventing the occurrence of the off tracking and rewriting the servo signals on the hard disc 20 by the servo writer so as to form the new track having the even width. In the graph of FIG. 11B, a bold line denotes the upper half width of the track and the other line denotes the lower half width of the track.

As described above, in the method of and the apparatus, according to the present invention, for preventing the off tracking from occurring in the hard disc drive, the track having the uneven width with respect to other disc tracks and caused by imprecise positioning of the servo writer which writes the servo signals on the hard disc, can be recovered into the new track having the even width. Also, the method and the apparatus can be used to detect and classify the hard disc having the unrecoverable tracks of the uneven widths as the inferior disc. Accordingly, it is possible to prevent any potential occurrence of the off tracking due to the track having the uneven width, thereby guaranteeing reliability of the hard disc. Further, the uneven widths of the tracks can be evenly recovered, thereby increasing a manufacturing yield of the hard disc.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. A method of preventing off tracking from occurring when a hard disc drive drives a hard disc having at least one track formed by servo sectors on which servo signals are recorded, the method comprising:

checking whether a width of the at least one track is uneven using burst regions A, B, C, and D included on each servo signal of the at least one track; and preventing occurrence of the off tracking when the width of the track is not even.

2. The method of claim 1, wherein the hard disc drive comprises a head, and the checking of whether the width of the at least one track is uneven, comprises:

measuring the width of each servo sector using the burst regions A through D read by the head during moving the head of the hard disc drive by first and second predetermined distances from a center of the track in first and second directions toward which a track number is increased and decreased, respectively;

checking whether the track has a servo sector whose width is yet to be measured, and repeating the measuring of the width of the servo sector to be measured upon determining that the servo sector whose width is yet to be measured is present;

measuring the width of the track having the servo sectors using widths of the servo sectors when the servo sector whose width is yet to be measured is not present;

checking if there is a track whose width is to be measured, and repeating the measuring of the width of the servo sector to be measured upon determining that there is the track whose width is to be measured;

calculating an average range of the width of the track using the widths of the tracks when there is no track whose width is to be measured; and checking whether the width of each track falls within the average range;

wherein the preventing of the occurrence of the off tracking comprises determining that the width of the track is not even if the width of each track does not fall within the average range.

3. The method of claim 2, wherein the measuring of the width of the each servo sector comprises:

checking whether the track is an odd numbered track or an even numbered track;

calculating a first absolute value by moving the head in the first direction from the center of the track by the first predetermined distance and by subtracting the burst region D from the burst region B that are read by the moving head, and calculating a second absolute value by moving the head in the second direction from the center of the track by the second predetermined distance and by subtracting the burst region D from the burst region A that are read by the moving head, when the track is the odd numbered track;

calculating a third absolute value by moving the head in the first direction from the center of the track by the first predetermined distance and by subtracting the burst region C from the burst region A that are read by the moving head, and calculating a fourth absolute value by moving the head in the second direction from the center of the track by the second predetermined distance and by subtracting the burst region C from the burst region B that are read by the moving head, when the track is the even numbered track;

calculating a first addition value by adding the first and second absolute values and calculating a second addition value by adding the third and fourth absolute values; and checking a degree to which the width of the servo sector is even using the first or second addition value, to check whether the track has a servo sector whose width is yet to be measured, and to repeat the measuring of the width of the servo sector to be measured upon determining that the servo sector whose width is yet to be measured is present.

4. The method of claim 2, wherein the first or second predetermined distance becomes a quarter of the width of the track when the width of the head becomes narrower.

5. The method of claim 2, wherein the first or second predetermined distance is a quarter of the width of the track.

6. The method of claim 3, wherein the checking of the degree to which the width of the servo sector is even, comprises:

checking whether the first or second addition value is the same as a predetermined value;

checking whether the first or second addition value is larger than the predetermined value when the first or second addition value is not the same as the predetermined value;

determining that the width of the track in the servo sector is wider than a normal width when the first or second addition value is larger than the predetermined value;

determining that the width of the track in the servo sector is narrower than a normal width when the first or second addition value is smaller than the predetermined value; and determining that the width of the servo sector is even when the first or second addition value is the same as the predetermined value, to check whether the track has a servo sector whose width is yet to be measured, and to repeat the measuring the width of the servo sector to be measured upon determining that the servo sector whose width is yet to be measured is present.

7. The method of claim 1, wherein the preventing of the occurrence of the off tracking comprises:

erasing the servo signals forming the track of an uneven width when the width of the track is not even; and forming a new track on a position corresponding to the erased track of the hard disc by writing the servo signals on the hard disc.

8. The method of claim 7, wherein the preventing of the occurrence of the off tracking comprises:

checking whether a degree of the uneven width of the track falls within a predetermined range when the width of the track is not even, to erase the servo signals if the degree of the uneven width falls within the predetermined range; and determining that the track cannot be recovered when the degree of the uneven width does not fall within the predetermined range.

9. The method of claim 8, wherein the preventing of the occurrence of the off tracking further comprises:

checking whether a total number of unrecoverable tracks is more than a predetermined number; and determining the hard disc of the unrecoverable tracks as an inferior disc when the total number of the unrecoverable tracks is more than the predetermined value.

10. The method of claim 1, wherein the checking of whether the width of the at least one track is uneven is performed during testing of the hard disc having the tracks.

11. An apparatus for preventing off tracking from occurring when a hard disc drive drives a hard disc having at least one track formed of servo sectors on which servo signals are recorded, the apparatus comprising:

a width checking unit checking whether a width of the at least one track is even using burst regions A, B, C, and D written on each servo sector, to output a checking result; and a controller controlling the width checking unit and preventing occurrence of the off tracking in response to the checking result.

12. The apparatus of claim 11, wherein the controller outputs a first control signal and a second control signal in response to the checking result, and controls erasing of the track having an uneven width in response to the first control signal and forms a new track, which is a substitute for the erased track by writing the servo signals on the hard disc in response to the second control signal.

13. The apparatus of claim 11, wherein the hard disc drive comprises a head, the controller outputs a third control signal and a fourth control signal in response to the checking result, and the width checking unit comprises:

a first width measuring unit determining a degree to which the width of the track in the servo sector is even using the burst regions A, B, C, and D that are read and input by the head of the hard disc drive, in response to the third control signal and the fourth control signal;

a second width measuring unit measuring the width of the track using the measured widths of the tracks in the servo sectors input from the first width measuring unit in response to the third control signal;

a range calculator calculating an average range of the width of the track using the widths of the tracks input from the second width measuring unit in response to the fourth control signal;

a comparator comparing the width of the track input from the second width measuring unit and the average range input from the range calculator to output a comparison result; and a signal generator generating an information signal to output the information signal as the checking result to the controller in response to the comparison result input from the comparator, the information signal indicating whether the width of the track is even, wherein the controller generates the third control signal based on a result of checking whether a servo sector whose width is yet to be measured is present in the track, and generates the fourth control signal based on a result of checking whether there is a track whose width is yet to be measured, and the head of the hard disc drive is moved a predetermined distance in first and second directions to read the burst regions A, B, C, and D in response to the third control signal, the first and second directions toward which a track number of the track is increased and reduced, respectively.

14. An apparatus for preventing off tracking from occurring when a hard disc drive drives a hard disc having at least one track formed of a servo sector having a plurality of burst regions on which servo signals are recorded, the apparatus comprising:

a width checking unit receiving signals from the burst regions of the servo sector of the at least one track to check whether a width of the at least one track is even using the signals of the burst regions of the servo sector and output a checking result indicating whether the width of the at least one track is even; and a controller erasing the servo signals from the burst regions of the servo sector of the at least one track and write the servo signals on the erased burst regions of the servo sector of the at least one track in response to the checking result to prevent occurrence of the off tracking.

15. The apparatus of claim 14, wherein the head has a first width in a radial direction of the hard disc, the track has a second width formed between first and second sides disposed on adjacent tracks, respectively, in the radial direction, and the signals comprises:

first sub-signals read from first portions of the burst regions disposed between a center line of the track and the first side of the track; and second sub-signals read from first portions of the burst regions disposed between the center line of the track and the second side of the track.

16. The apparatus of claim 15, wherein the controller controls the head to move a center of the head between the center line and one of the first and second sides.

17. The apparatus of claim 15, wherein the width checking unit calculates a first absolute value from the first sub-signals and a second absolute value from the second sub-signals to generate the checking result from the first and second absolute values.

18. The apparatus of claim 17, wherein the width checking unit calculates an addition value from the first and second absolute values and compares the addition values with a reference value to generate the checking result.

19. The apparatus of claim 15, wherein the second width of the track is larger than the first width of the head.

20. The apparatus of claim 15, wherein the controller controls the head to read the first and second sub-signals representing corresponding ones of the servo signals of the servo regions of the servo section of the track.

21. The apparatus of claim 14, wherein the burst regions comprises first, second, third, and fourth burst regions, the servo signals are stored in two of the first, second, third, and fourth burst regions, and the controller controls the head to read the signals from the two of the first, second, third, and fourth burst regions.

22. The apparatus of claim 14, wherein the at least one track comprises an odd numbered track and an even numbered track, and the controller controls the head to read from the burst regions of the odd and even numbered tracks.

23. The apparatus of claim 22, wherein the odd and even numbered tracks are disposed adjacent to each other in a radial direction of the hard disc.

24. The apparatus of claim 22, wherein each of the odd and even numbered tracks comprises the burst regions, the burst regions comprises first, second, third, and fourth burst regions, the servo signals are stored in two of the first, second, third, and fourth burst regions of the odd numbered track and in two of the first, second, third, and fourth burst regions of the even numbered track, and the controller controls the head to read the signals from the two of the first, second, third, and fourth burst regions of the odd numbered track and from the two of the first, second, third, and fourth burst regions of the even numbered track.

25. The apparatus of claim 22, wherein:
the track comprises,
a center line and first and second sides disposed opposite the center line and on adjacent tracks in a radial direction of the hard disc; and
each of the first, second, third, and fourth burst regions comprises,
a first portion disposed between a center line of the track and a first side of the track, and
a second portion disposed between the center line of the track and the second side of the track.

26. The apparatus of claim 25, wherein the controller controls the head to read the signals from the first and second portions of the first, second, third, and fourth burst regions of the odd and even numbered tracks.

27. An apparatus for preventing off tracking from occurring when a hard disc drive drives a hard disc having at least one track formed of a servo sector having a plurality of burst regions, the apparatus comprising:

a width checking unit reading signals from the burst regions of the servo sector of the at least one track to output a checking result indicating a width of the at least one track; and a controller controlling writing servo signals on the burst regions of the servo sector of the at least one track in response to the checking result to prevent occurrence of the off tracking.

28. A method of preventing off tracking from occurring when a hard disc drive drives a hard disc having at least one track formed of a servo sector having a plurality of burst regions, the method comprising:

reading signals from the burst regions of the servo sector of the at least one track to output a checking result indicating a width of the at least one track; and writing servo signals on the burst regions of the servo sector of the at least one track in response to the checking result to prevent occurrence of the off tracking.

* * * * *